[11] 3,589,795

[72] Inventors Eiichi Miyazaki;
Kaoru Tomii, both of Kadoma City, Osaka, Japan
[21] Appl. No. 839,155
[22] Filed July 7, 1969
[45] Patented June 29, 1971
[73] Assignee Matsushita Electric Industrial Company Limited
Osaka, Japan
[32] Priority July 10, 1968
[33] Japan
[31] 43-49,270

[54] FIBER OPTICS ELEMENT WITH OBLIQUE INTERNAL REFLECTOR MEANS
4 Claims, 7 Drawing Figs.
[52] U.S. Cl.............................................. 350/96 B,
313/92 (LF)
[51] Int. Cl............................................. G02b 5/16
[50] Field of Search........................................... 350/96;
313/92; 250/227; 355/1

[56] References Cited
UNITED STATES PATENTS
| | | | |
|---|---|---|---|
| 3,125,013 | 3/1964 | Herrick et al. | 350/96 (B) X |
| 3,192,843 | 7/1965 | Kapany et al. | 350/96 (B) X |
| 3,327,584 | 6/1967 | Kissinger | 350/96 (B) X |
| 3,449,036 | 6/1969 | Jacobsen | 350/96 (B) |
| 3,467,774 | 9/1969 | Bryant | 350/96 (B) X |

*Primary Examiner*— David H. Rubin
*Attorney*— John Lezdey

ABSTRACT: A fiber optics element for picking up light reflected by a subject copy which is disposed closely adjacent to the one face thereof, said fiber optics element comprising a first fiber plate formed of a plurality of optical fibers through which the incoming light is conducted to said subject copy, a second fiber plate formed of like optical fibers through which the light reflected by said subject copy is conducted in a direction different from that of said incoming light and a reflector means for reflecting said light conducted by said second fiber plate to provide a light output modulated by said subject copy.

PATENTED JUN29 1971 3,589,795
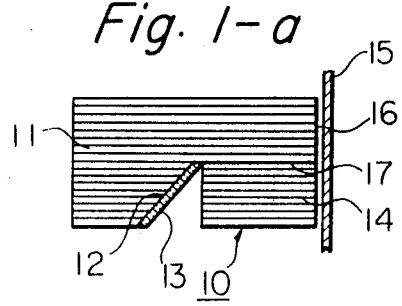
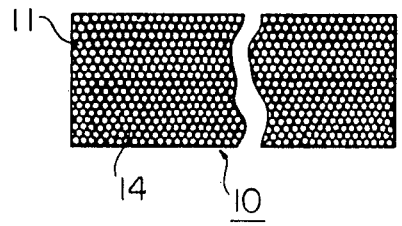
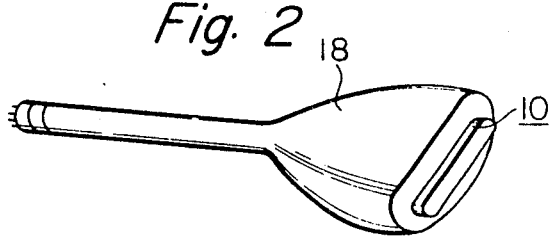
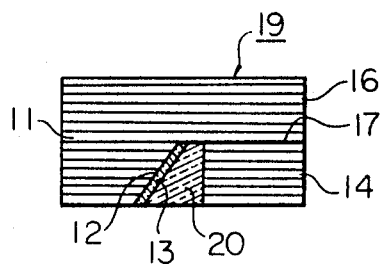
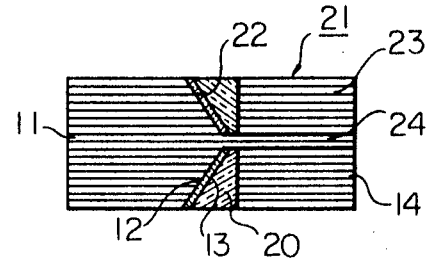
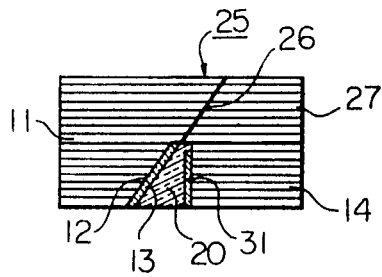
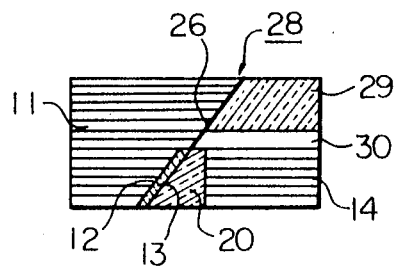
INVENTORS
EIICHI MIYAZAKI
KAORU TOMII
BY John Lydely
ATTORNEY

FIBER OPTICS ELEMENT WITH OBLIQUE INTERNAL REFLECTOR MEANS

This invention relates to a fiber optics element adapted to pick up light reflected by a subject copy and it is the object of the invention to provide such a fiber optics element having an improved optical signal-to-noise ratio and a high percentage of light utilization as compared to such devices available heretofore.

The fiber optics element according to the invention comprises a first fiber plate formed of a plurality of optical fibers through which the incoming light is conducted to the subject copy, a second fiber plate formed of like optical fibers through which the light reflected by the subject copy is conducted in a direction different from that of said incoming light and a reflector means for reflecting the light conducted by said second fiber plate to provide a light output modulated by said subject copy.

With a view to improving the signal-to-noise ratio and percentage of light utilization of the fiber optics element, the invention contemplates to provide for improved configurations of the fiber optics element whereby most of the light conducted through said first fiber plate is reflected by the subject copy and is picked up by the second fiber plate without permitting the ambient light to be introduced to said second fiber plate.

These configurations and some preferred applications of the fiber optics element embodying the invention will be appreciated from the following description taken in conjunction with the accompanying drawings in which like reference characters indicate like parts and in which:

FIGS. 1-a and 1-b are a side view and a front end view, respectively, of one preferred form of the fiber optics element according to the invention;

FIG. 2 is a perspective view of a cathode-ray tube with the fiber optics element of the invention; and FIGS. 3 through 6 are views showing modified forms of the fiber optics elements of FIGS. 1-a and 1-b.

Referring now to FIGS. 1-a and 1-b, the fiber optics element 10 according to the invention consists largely of a first fiber plate 11 formed of a plurality of optical fibers and having a cut surface 12 which is oblique to the fiber axes thereof, a mirror 13 provided on a portion of said cut surface 12 and a second fiber plate 14 formed of like optical fibers and provided adjacent to said first fiber plate 11 so as to receive the light reflected by a subject copy 15 and to transmit it to said mirror 13. As shown, the subject copy 15 carrying thereon the images to be scanned is placed direct on or positioned in close proximity to the face 16 of the element 10. The subject copy 15 is usually in the form of photographs, written messages, maps or drawings. In this preferred embodiment of the invention, the cut surface 12 is angled at 45° to the fiber axes of said first fiber plate 11.

The incoming light incident on the inner face (i.e. the entrance side) of the fiber optics element 10 thus arranged is transmitted through the first fiber plate 11 toward the outer face 16 (i.e. the exit side) thereof, that is, from left to right in FIG. 1-a. It is to be noted that the incoming light is introduced into the first fiber plate 11 within a restricted portion so that the light entering the first fiber plate 11 advances within the optical fibers which are adjacent to the boundary 17 between the fiber plates 11 and 14.

The light transmitted through the first fiber plate 11 is projected on the subject copy 15 and is reflected thereby. The amount of reflected light varies with the blackness of the images in the subject copy 15. As the incoming light is reflected by the subject copy 15, scattering of the reflected light takes place and a portion of the scattered light enters the second fiber plate 14 and is conducted therethrough. The reflected light eventually reaches the mirror 13 and is reflected thereby in a direction rectangular to the fiber axes to a light-sensing means (not shown).

In this instance, in order to cause as much reflected light as possible to enter the second fiber plate 14, it is important that the optical fibers constituting the second fiber plate 14 have a numerical aperture which is substantially equal to or larger than that of the optical fibers constituting the first fiber plate 11.

FIG. 2 shows one application of the fiber optics element 10 of the invention when used as a faceplate of a cathode-ray tube 18.

FIG. 3 shows another embodiment of the fiber optics element 19 of the invention, in which a glass member 20 is interposed between the mirror 13 and second fiber plate 14. This insertion of the glass member 20 adds to the mechanical strength of the entire structure. It is, of course, essential that the glass member 20 is as clear as possible so as to conduct the light which is reflected by the subject copy 15 and conducted through the second fiber plate 14, to the following light-sensing means (not shown), such as a phototube or photodiode.

FIG. 4 shows another modification of the fiber optics element 21 of the invention in which another mirror 22 and second fiber plate 23 are mounted to the first fiber plate 11. In this specific embodiment, the portion 24 of the first fiber plate 11 which is sandwiched between the two second fiber plates 14 and 23 has a thickness substantially equal to the diameter of the incoming light. A glass member 20 is interposed between the mirror and second fiber plate in both sets for the purpose of increasing the mechanical strength of the entire structure.

FIG. 5 illustrates a further modification of the fiber optics element 25 of the invention. The fiber optics element 25 comprises a first fiber plate having a cut surface 12 which traverses the axes of the optical fibers constituting said first fiber plate 11 obliquely to the fiber axes thereof, a mirror 13 provided on a portion of said cut surface, a half mirror 26 provided on the remainder of said cutting surface 12, a third fiber plate 27 provided adjacent to said half mirror 26 for conducting the light passed through said first fiber plate 11 to said subject copy 15, a second fiber plate 14 provided adjacent to said third fiber plate 27 so as to catch the reflected light and transmit it to said mirror 13 and a glass member 20 provided between said mirror 13 and second fiber plate 14. In this specific embodiment, the light emitted from a light source (not shown) is conducted through the first fiber plate 11 and is passed through the half mirror 26. The light is further conducted through the third fiber plate 27 adjacently to the second fiber plate 14 to hit the subject copy 15 and is reflected thereby. A portion of the light scattered by the subject copy 15 enters the second fiber plate 14 to be transmitted therethrough to the glass member 20 and is reflected by the mirror 13. Another portion of the scattered light is again incident on the third fiber plate 27 to advance in a direction opposite to that of the incoming light and is reflected by the half mirror 26 to enter the glass member 20. Thus, a high percentage of light utilization can be attained with this configuration.

FIG. 6 shows a further modified configuration of the fiber optics element 28 of the invention which is similar to that of FIG. 5 except that the third fiber plate 27 is replaced by an light-absorbing glass 29 and a fiber plate 30 of which the optical fiber has a diameter equal to that of the incoming light. In this specific embodiment the light-absorbing glass 29 is made of such material as used in a neutral density filter, having a characteristics of absorbing uniformly the entire spectral region of light, not only a portion of spectral region thereof.

In any of the embodiments above described, it is advantageous to provide another mirror 31 on a portion of the inner face of the second fiber plate 14 which is not involved in the conduction of the reflected light from the subject copy 15, as exemplified in FIG. 5. The provision of the mirror 31 prevents the light reflected by the mirror 13 from reentering the second fiber plate 14, thus increasing the percentage of light utilization and optical signal-to-noise ratio of the fiber optics element.

We claim:

1. A fiber optics element for illuminating and picking up the light reflected by a subject copy which is disposed closely adjacent to one end face thereof, said fiber optics element comprising, a first fiber plate with parallel end faces formed of a plurality of optical fibers for transmitting therethrough the incoming light to said subject copy and having at least one cut surface which is oblique to the fiber axes thereof, said cut surface extending inwardly from a side surface of said first fiber plate intermediate the end faces to a position adjacent the central axis of said first fiber plate and angled inwardly toward said one end face adjacent the subject copy, at least one second smaller fiber plate formed of a plurality of optical fibers and attached adjacent to and in parallel with said first fiber plate in the space between said cut surface and said one end face for transmitting therethrough said reflected light in the direction opposite to that of said incoming light, said second fiber plate having parallel end faces with the outer end face aligned with said one end face of said first fiber plate and with the inner end face adjacent to and facing said cut surface, to define a triangular notch extending inwardly from the side surface of the fiber optics element, and a full reflector means mounted on said cut surface for reflecting the light transmitted through said second fiber plate laterally so as to provide a light output modulated by said subject copy, the numeral aperture of the optical fibers of said second fiber plate being at least as great as that of the optical fibers of said first fiber plate.

2. A fiber optics element according to claim 1, wherein said cut surface is formed at an angle of 45° to said fiber axes and the numerical aperture of the optical fibers of said second fiber plate is substantially larger than that of the optical fibers of said first fiber plate.

3. A fiber optics element according to claim 1, further comprising a transparent filler member which is interposed in the triangular notch between said full reflector means and said inner end face of said second fiber plate.

4. A fiber optics element according to claim 1, wherein a second cut surface and full reflector means are provided on the opposite side surface of said first fiber plate, with a third smaller fiber plate, to define a symmetrical arrangement with at least a central row of optical fibers of said first fiber plate extending continuously between the end faces of said fiber optics element for illuminating the subject copy.